United States Patent [19]

Fung

[11] 4,380,046

[45] Apr. 12, 1983

[54] MASSIVELY PARALLEL PROCESSOR COMPUTER

[76] Inventor: Robert A. Frosch, Administrator of the National Aeronautics and Space Administration, with respect to an invention of Lai-Wo Fung, Morristown, N.J.

[21] Appl. No.: 41,143

[22] Filed: May 21, 1979

[51] Int. Cl.³ .................... G06F 15/16; G06F 15/347
[52] U.S. Cl. .................................................. 364/200
[58] Field of Search ... 364/200 MS File, 900 MS File; 235/92 SH

[56] References Cited

U.S. PATENT DOCUMENTS

| | | | |
|---|---|---|---|
| 3,287,702 | 11/1966 | Borck, Jr. et al. | 364/200 |
| 3,287,703 | 11/1966 | Slotnick | 364/200 |
| 3,372,382 | 3/1968 | Newman | 364/200 |
| 3,473,160 | 10/1969 | Wahlstrom | 364/200 |
| 3,544,973 | 12/1970 | Borck, Jr. et al. | 364/200 |
| 3,815,095 | 6/1974 | Wester | 364/200 |
| 3,936,806 | 2/1976 | Batcher | 364/200 |
| 4,031,512 | 6/1977 | Faber | 364/200 |
| 4,047,201 | 9/1977 | Kerllenevich | 364/200 |
| 4,065,808 | 12/1977 | Schomberg et al. | 364/200 |
| 4,092,522 | 5/1978 | Miller | 235/92 SH |
| 4,162,532 | 7/1979 | Olander, Jr. | 364/200 |

OTHER PUBLICATIONS

"The Solomon Computer" Slotnick et al., Proceedings of the 1962 Fall Joint Computer Conference, pp. 97-107.
H. Gschwind, Design of Digital Computers, 1975, pp 179-191.

Primary Examiner—James D. Thomas
Assistant Examiner—David Y. Eng
Attorney, Agent, or Firm—Ronald F. Sandler; John R. Manning; John O. Tresansky

[57] ABSTRACT

An apparatus for processing multidimensional data with strong spatial characteristics, such as raw image data, characterized by a large number of parallel data streams in an ordered array, comprises a large number (e.g. 16,384 in a 128×128 array) of parallel processing elements operating simultaneously and independently on single bit slices of a corresponding array of incoming data streams under control of a single set of instructions. Each of the processing elements comprises a bidirectional data bus in communication with a register for storing single bit slices together with a random access memory unit and associated circuitry, including a binary counter/shift register device, for performing logical and arithmetical computations on the bit slices, and an I/O unit for interfacing the bidirectional data bus with the data stream source. The massively parallel processor architecture enables very high speed processing of large amounts of ordered, parallel data, including spatial translation by shifting or "sliding" of bits vertically or horizontally to neighboring processing elements.

14 Claims, 15 Drawing Figures

FIG. 11  PE COMMANDS FROM ARRAY INSTRUCTION REGISTER IN ACU 24 (ALL AVAILABLE AT RISING EDGES OF MASTER CLOCK)

FIG.12

MASSIVELY PARALLEL PROCESSOR COMPUTER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The present invention relates generally to multidimensional data processing computers, and more particularly, toward a single instruction, multiple data stream computer, comprising a large number of individual processing elements operating in parallel on multiple data streams in single bit slices, simultaneously and in an identical manner, in response to a single set of instructions stored in a processor array control unit. The massively parallel processor architecture has particular utility to real time processing of image data generated by an image sensor array as a large number of parallel data streams, each corresponding to a picture element (pixel). The architecture is also useful for processing any other ordered, multidimensional array of parallel data.

Conventional digital computers are composed of devices that are programmed to perform logical operations on one dimensional binary signals. These computers, although possible to be adapted to process multidimensional binary signals, are inefficient and slow for that purpose because the multidimensional data must be converted to a single, serial data stream suitable for conventional single dimensional signal processing.

There have been increasing applications in image processing and other spatially oriented computations where, for example, transmission of raw, multidimensional data from satellite based sensors to ground must undergo signal processing such as distortion correction and classification. Thus, there have been increasing requirements for multidimensional data processing computers that are fast enough to operate in real time on two or more dimension data (such as two dimensional imaging data) and compact enough to be carried on board in satellites, missiles or spacecraft.

In response, various types of multidimensional data processors for applications such as image processing have been developed. The prior art includes a two dimensional digital computer that operates on parallel optical signals arranged in an ordered array, including several different types of optical elements to provide direct image processing, such as sliding and interleaving. One embodiment of the computer operates in the optical domain using fiber optics and may be adapted to process electrical binary signals under program control. Also, operations on data are basically logical manipulations and complex operations such as arithmetic computations are executed by multiple-step programs.

Other approaches taken, wherein electrical image signals are processed for arithmetic as well as logical operations have been too complex for on-board utilization. For example, "giant" computers, such as the ILLIAC IV, have been utilized wherein a number of data streams are processed in a smaller number of parallel processors. A substantial portion of the computation time must be devoted, however, to data partitioning, and routing, and is, therefore, impractical.

SUMMARY OF THE INVENTION

An object of the present invention, therefore, is to provide a multidimensional data processing computer that simultaneously processes a large number of parallel electrical signals to enable high speed processing of parallel data arrays.

Another object is to provide a new and improved multidimensional data processing computer that operates simultaneously on a large number of data streams in parallel for processing two dimensional imaging data in real time.

A further object of the invention is to provide a new and improved multidimensional data processing computer composed of an array of parallel, identical processing elements that operate individually on parallel data streams in a multidimensional data array in response to a single set of instructions.

Yet another object is to provide a new and improved multidimensional data processing computer having a large number of identical processing elements operating in parallel in response to a single set of instructions to process an array of data streams in single bit data slices.

Still another object is to provide a new and improved multidimensional data processing computer having an array of identical processing elements operating in parallel in response to a single set of instructions stored in a processor array control unit, wherein the elements operate individually on a large number of incoming data streams in single bit slices defining an image plane, wherein the bits are logically and arithmetically processed as well as shifted among processor elements under single program control.

Yet another object is to provide a new and improved, multidimensional data processing computer of the type described above, that is relatively simple and compact, and thus adapted for onboard utilization in spacecraft, satellites and the like.

Still another object is to provide a new and improved processing element which is both simple and compact yet retains high speed and flexible capabilities.

In accordance with the invention, a single instruction, multiple data stream computer comprises an N×M (most often, M=N) array of processing elements, individually and simultaneously operating on an N×M array of parallel streams of data under control of a single instruction set stored in a processing element array control unit. Data flow between the processing element array and control unit as well as with respect to peripheral devices is managed by a program and data management unit that is a general purpose mini computer having N bit input and N bit output data registers. The program and data management unit also loads programs into the processor array control unit for execution, supplies data to the processing elements, displays results and handles housekeeping such as diagnostics and interfacing.

The array of processing elements is of particular importance to the invention. Each processing element is formed of three basic components, an arithmetic, logic and routing unit (ALRU), and I/O unit and a local memory unit, all interconnected in a bidirectional data bus. The ALRU contains three subunits, a binary counter/shift-register subunit, a logic-slider subunit and a mask subunit. The logic-slider subunit contains a one bit storage register (P-register). This subunit executes logical operations as well as slides bits to "nearest neighbor" processing elements in the array.

The binary counter/shift-register subunit contains a series of registers (C-register). This subunit is operative selectively as a counter or shift register in response to command signals supplied by the array control unit. In the counter mode, the contents of the subunit are incremented by the instantaneous logic state of the bidirectional data bus. In the shift register mode, the contents are downshifted by one stage, emptying the predownshift value of the lowest stage of the register to the data bus. While a closed ring configuration is disclosed, it should be emphasized that a conventional counter/shift-register could be employed.

The mask subunit contains a one bit register (G-register). This subunit selectively inhibits both the P-register and counter/shift register in response to the array control unit. In a masked mode, an instruction generated by the array control unit will be executed in only those processing elements having their G-registers in a logical one state whereas in an unmasked mode, execution of instructions by the processing elements is not affected by the state of their corresponding G-registers.

The I/O (sub) unit serves as a storage element for input and output operations. The instantaneous logical state of the bidirectional data bus can be stored into the I/O unit in a one bit register (S-register), and similarly, the logical state of the S-register can be read out to the data bus. The I/O unit is capable of shifting bits to the I/O unit in neighboring processing elements. As disclosed, the bits are shifted only in a single direction (from left to right). Thus, in a 128×128 processing element array, a 128×128 member, one bit slice data stream array will require 128 shifting operations to move the data array into the processing element array. Another 128 shifting operations are required to move the data out of the processing element array. The data bits may be also, as aforementioned, moved directly between P-registers in a "nearest neighbor" fashion in a procedure termed "sliding." Sliding enables an instantaneous one-bit slice of an image to be translated vertically or horizontally in the image plane.

The single instruction characteristic of the present architecture causes a common bit slice of all data streams to be operated upon simultaneously without additional software.

The local memory unit is a multiple bit, random access memory (RAM), for storing the logical state of the data bus at a memory location addressed by the array control unit. Again, because the processing element array is controlled by a single set of instructions in the control unit, identical memory locations in all RAMs are simultaneously addressed for reading or writing.

Data communication among the logic-slider subunit, counter/shift register and mask subunits of each ALRU as well as the corresponding I/O unit and the RAM on the bidirectional data bus enables processing of single bit slices of the parallel stream data array under program control for diverse applications such as cross correlation, distortion correction and identification. Sliding of data in the processor array is executed independently of other processing element operations so that data input and output can take place simultaneously with array computations.

Still other objects and advantages of the present invention will become readily apparent to those skilled in this art from the following detailed description, wherein there is shown and described only the preferred embodiments of the invention, simply by way of illustration of the best modes contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENT

Figure 1:
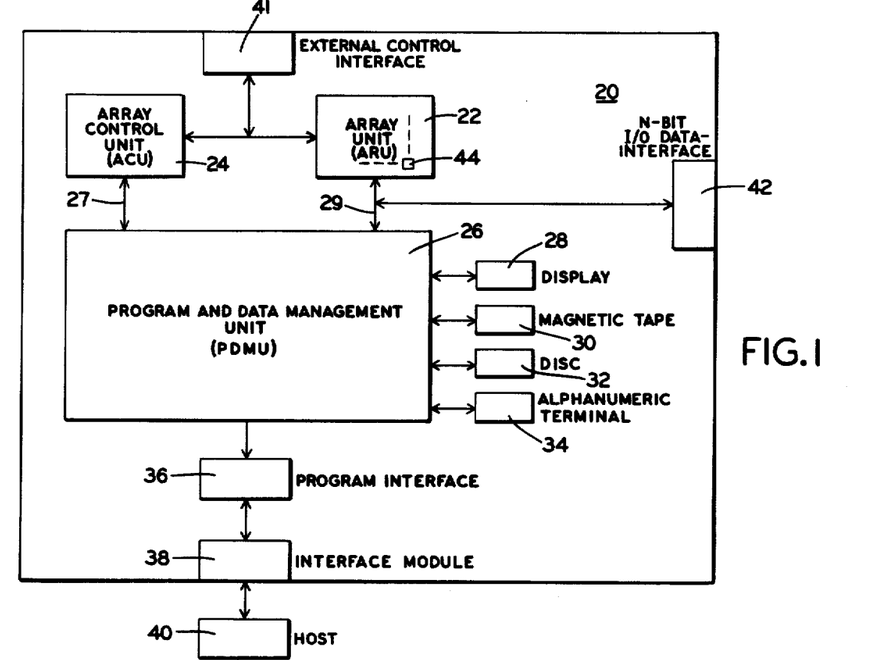
FIG. 1 is a block diagram showing the primary components of a massively parallel processing computer, in accordance with the invention.

Referring to FIG. 1, a massively parallel processor computer 20, in accordance with the invention, comprises as its basic component a processing element array unit (ARU) 22 which functions as a single instruction, multiple data stream computer formed of an N×N array of processing elements 44 (FIG. 2), to be described below, operating under common control by an array control unit (ACU) 24.

The ACU 24 provides ARU 22 with instructions for execution at a predetermined clock rate under control of a master clock (not shown) and includes instruction looping and subroutine handling capability. Data flow is managed among ARU 22 and ACU 24 and peripherial devices, such as a CRT display 28, a tape recorder 30, disc memory 32 and printer 34, by a program and data management unit (PDMU) 26. PDMU 26 loads programs into ACU 24 for execution along line 27 and also provides input data along line 29 to the ARU 22.

PDMU 26 further displays results and controls data housekeeping functions, such as test and diagnostic routines to both ACU 24 and ARU 22, along lines 27, 29 and manages all data flow and interfacing. PDMU 26, which is a general purpose mini computer, such as a PDP-11, manufactured by Digital Equipment Corporation, is provided with N-bit input and output data registers (not shown) for communication through data path 29 with the ARU 22 having the N×N square array architecture, under control of ACU 24.

System 20 is interfaced with a program interface unit 36 and an interface module 38 (such as a DR-70 interface module 80, manufactured by Digital Equipment Corporation) to a host computer 40 (such as PDP 11/70) programmed for operation, for example, as an atmospheric and oceanographic information processing system (AOIPS) for supplying imaging data to the system 20. Communication of programming data between the computer 40 and PDMU 26 through the conventional interface unit 36 enables the host computer 40 to request operation of system 20 directly for processing imaging data. Additional interface units 41 and 42 enable, respectively, direct control of array unit 22 by external control signals as an alternative to control by ACU 24 and accessing of data flowing between the ARU 22 and PDMU 26.

In accordance with the data processing strategy of the present invention, a large number ($N^2$, where N is an integer on the order of at least 128) of streams of data in an (N×N) array having strong spatial characteristics, such as raw imaging data, generated by an AOIPS computer, are simultaneously processed in parallel within the individual processing elements 44 constituting ARU 22. In a two dimensional system for processing imaging data, for example, the (N×N) data streams are supplied to ARU 22 where, under control of ACU 24, they are simultaneously processed in elements 44 under a single set of instructions, in single bit data slices constituting binary image planes. All of the processing elements 44 of the array 22 are identical to each other, i.e., are constituted by identical electrical components. Thus, a considerable number of the processing elements 44 (approximately four, using present technology) can be fabricated on a single LSI chip. As will become clear from the following, the data in each image plane can be modified, under the program control, to undergo arithmetic as well as logical processing and can be translated as a single block in vertical or horizontal directions in a process known as "sliding."

Figures 2, 3:
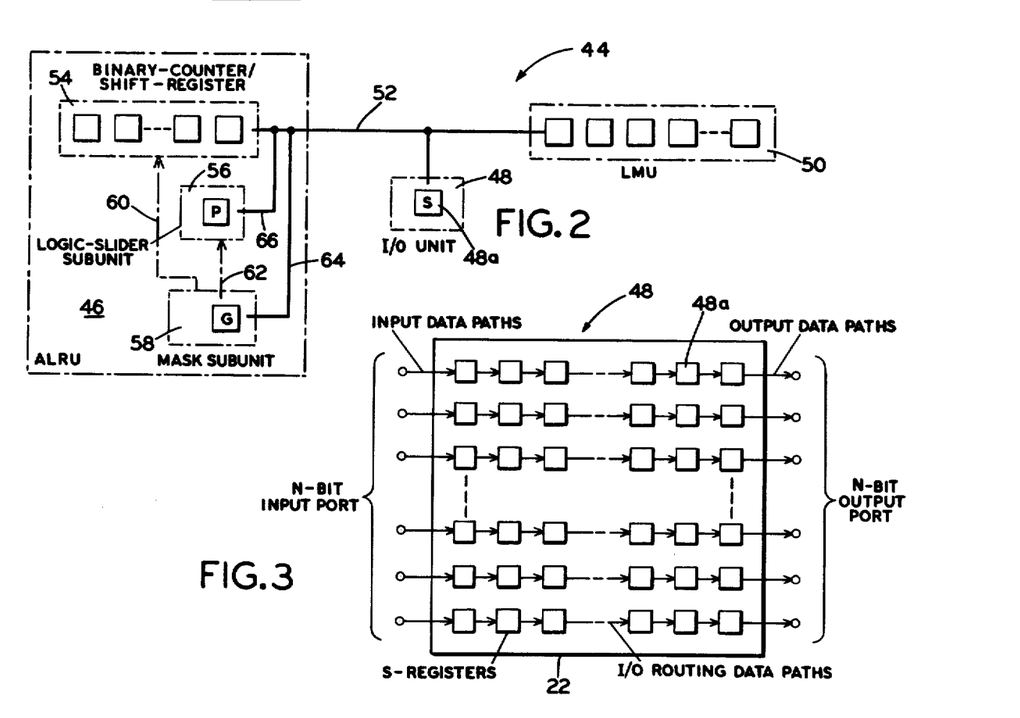
FIG. 2 is a circuit diagram showing the basic structure of each processing element in the ARU shown in FIG. 1.
FIG. 3 is a data flow diagram showing the left to right shifting characteristic of the S-registers in the I/O unit shown in FIG. 2.

Referring to FIG. 2, the basic structure of each processing element 44 in ARU 22 includes an arithmetic logic and routing unit (ALRU) 46, an input and output (I/O) unit 48 and a local memory unit (LMU) 50 in the form of a single-bit, random access memory (RAM), all interconnected on a bidirectional data bus 52 which transfers data on a single-bit basis. Multiple-bit logic and arithmetic operations are performed with special algorithms which are based on bit-serial data transfers along data bus 52, and on bit-wise functions provided by the ALRU 46.

ALRU 46 constitutes three functional components, a binary counter/shift register (BC/SR) subunit 54, a logic-slider subunit 56 including a single bit register (P-register) and a mask subunit 58 including a second single bit register (G-register). The BC/SR 54, logic-slider subunit 56 and mask subunit 58 are connected together within ALRU 46 along data and control lines 52, 60, 62, 64 and 66.

The I/O unit 48 shall be described in detail below in connection with FIG. 8. For the present, it is sufficient to say that the I/O unit 48 has a single bit storage S-register 48a which serves as a storage element for input and output of data with respect to the processing element 44. The instantaneous logical state of data bus 52 can be stored, under control of ACU 24, in the S-register 48a of I/O unit 48 and conversely the logical state of the I/O unit 48 can be read out through the data bus 52. The S-register 48a in I/O unit 48 of any processing element 44 in ARU 22 can also receive an input bit from the S-register of the processing element to its left, thus achieving the transfer of the contents of all S-registers to the S-registers of the processing elements to their right. This latter mode is used for inputting and outputting data with respect to the ARU 22, as illustrated in FIG. 3.

LMU 50 contains a number of basic storage units, e.g., 256 bits of random access memory (RAM). The logical state bit of data bus 52 can be stored into the LMU 50 at any memory bit location addressed by ACU 24. Similarly, the bit stored at any memory location at LMU 50 can be read out by the ACU 24. Of particular significance, the single instruction characteristic of the massively parallel processor architecture of the present invention causes identical addressing of all LMUs in the ARU 22 for reading or writing. In actual implementation, commercial RAM integrated circuit chips can be used in LMU 50 although these chips are usually oriented towards multiple-bit-words. In this case, each bit in the word of the RAM chips corresponds to LMU 50 for one processing element 44; as many processing elements 44 as the number of bits in the word will be provided with local memory unit 50 which are all housed in one integrated circuit chip. Further details of the structure and operation of the LMU 50 shall be described below in connection with FIG. 9.

Intercommunication among the $N^2$ processing elements 44 within ARU 22 is by two separate routing networks. Referring to FIG. 3, data flow among the S-registers 48a of array 22, as mentioned above is only from left to right. An N×N array of parallel data streams is loaded into ARU 22 by entering one N-bit column of the data array via the N-bit input port into the first (left hand side) column of S-registers 48a of the array of I/O units 48 shown in FIG. 3. This N-bit column of the data array comes either from the program and data management unit 26 via data paths 29, or from external devices through the N-bit I/O data-interface 42. The entire array of data is then successively shifted N positions to the right until the array of S-registers 48a contains a complete one bit image plane stored therein. This image plane is then stored into the LMU 50 for later processing by a transfer from the S-register 48a into corresponding memory cells at some memory location of the LMU 50 via the bidirectional data bus 52. Usually the raw imaging data are digitized into a number of bits of precision, so that the above process of inputting one bit image plane is repeated as many times as the number of bits of precision. Following processing of the stored raw data in the array of processing elements 44 by logical and arithmetic operations in the ALRU 46 and LMU 50, the image planes are transferred from LMU 50 into the S-registers, one bit plane at a time, and then read out from the array 22 by shifting all the stored bits N positions to the right through the output port. One N-bit column at a time is stored either into the PDMU 26 through data path 29, or into external devices through the I/O data interface 42. The PDMU 26 in FIG. 1 contains N-bit input and output data registers for the above storage of N-bit column data.

In another mode, bits are shifted vertically or horizontally directly among neighboring processing elements 44 in a nearest neighbor fashion without passing through the I/O unit 48 in a process termed "sliding."

Figure 4:
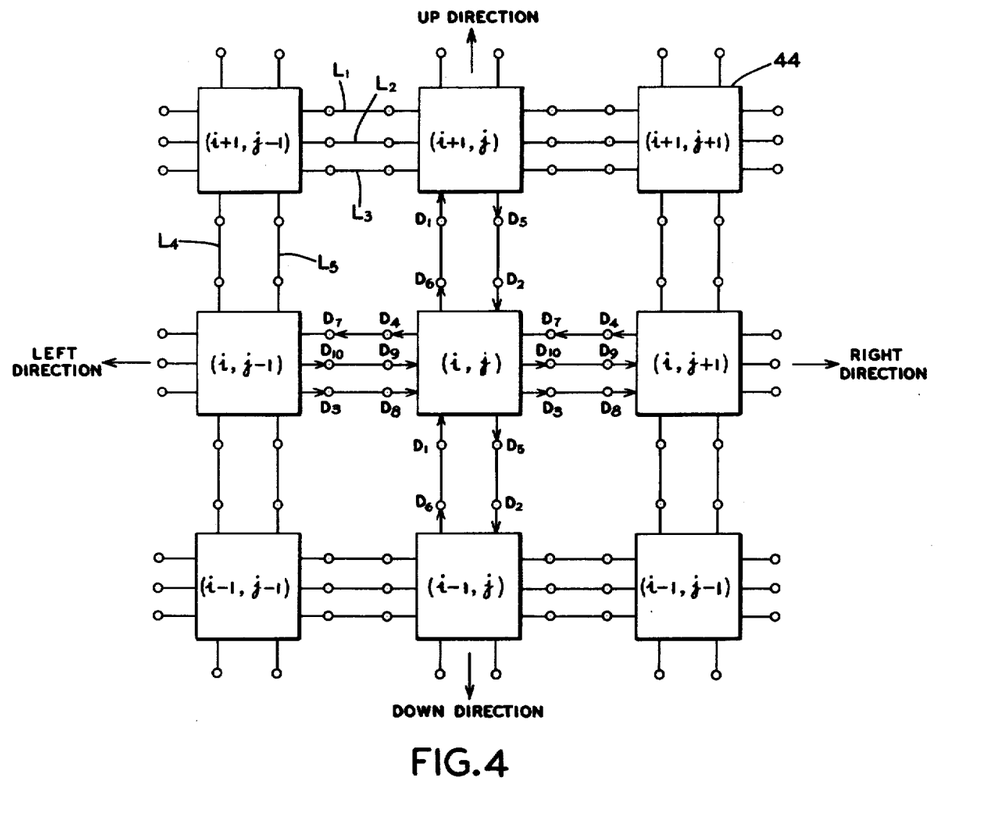
FIG. 4 is a data flow diagram showing "nearest neighbor" routing of data among the processing elements through corresponding logic/slider subunits in the ARU.

Referring to FIG. 4, the "nearest neighbor" routing incorporated by the logic-slider subunits 56 of ARU 22 under control of ACU 24 is illustrated. Each block represents a processing element 44 in ARU 22 with element (i, j) in the center of FIG. 4 representing a general processing element, and the remaining eight processing elements shown in the Figure being the "nearest neighbor" elements in the array. It is to be understood that whereas nine elements are shown in FIG. 4 for the purpose of illustration, an actual array may contain, for example, 16,384 processing elements in a 128×128 (N×N) array. Neighboring horizontal processing elements are connected together by three separate lines $L_1$, $L_2$ and $L_3$ whereas neighboring vertical elements are interconnected by lines $L_4$ and $L_5$. During inputting and outputting of data, in the manner described above with respect to FIG. 3, data bits are transferred between processing elements through I/O units 48 from left to right along paths $L_2$ (I/O units are not shown in the path $L_2$ for simplicity). Sliding of data up, down, left and right in the nearest neighbor fashion, however, is made directly on lines $L_1$ and $L_3$, respectively, for left or right direction data slides, and on lines $L_4$ and $L_5$, respectively, for up and down data slides. Data caused to slide beyond a processing element on the outer boundaries of ARU 22 are lost; feedback, however, to opposite boundaries for "wraparound" data routing may optionally be provided.

An overview of the basic components of the massively parallel processor computer 20 having been given above, the structure and operation of the computer shall now be described in detail with reference to FIGS. 5–12. For the purpose of the following discussion, the following assumptions will be made. For all gates and signals, logical one is represented by a high signal level and logical zero is represented by a low signal level; all tri-state output gates invert their input signals; all D-type flip flops are triggered by the rising edges of the signals presented to their clock inputs, data being strobed into the flip flops at these rising edges; and all toggle flip flops are toggled (i.e., states of the flip flops change from 0 to 1, or from 1 to 0) at the rising edges of their input signals. Development and detailed characteristics of various control signals described throughout the Figures shall be described in detail in connection with FIGS. 10–12.

Figure 5:
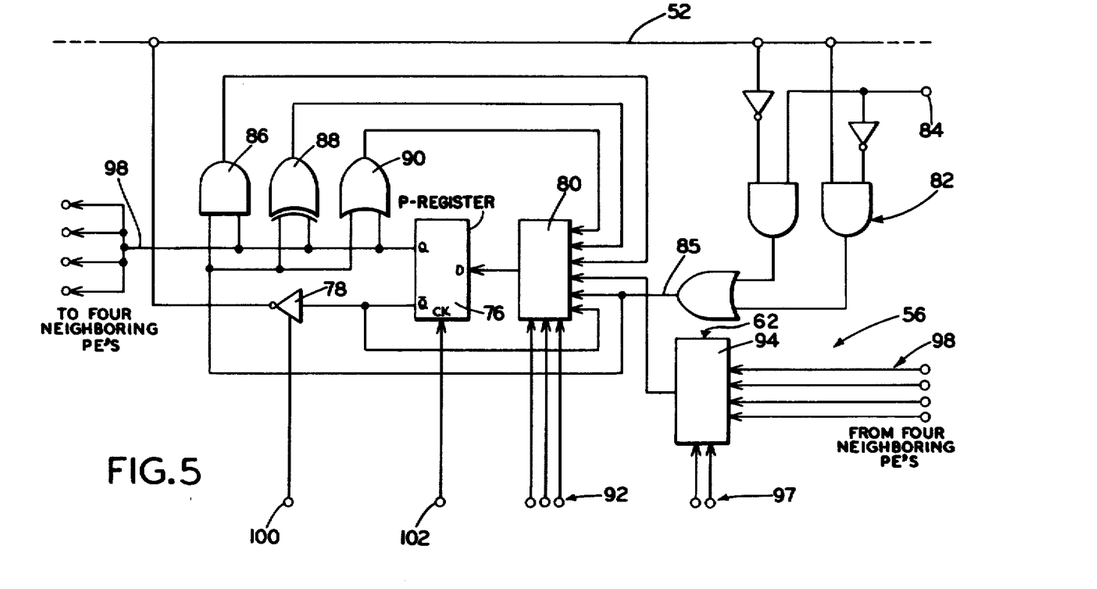
FIG. 5 is a schematic diagram of the logic-slider subunit for controlling data flow among neighboring processing elements in the array.

Referring first to FIG. 5, the structure and operation of logic-slider 56 within ALRU 46 are now discussed. Logic-slider 56 comprises a flip flop 76 functioning as the basic storage register, or P-register, for storing a single bit data slice together with logic circuitry for performing logic operations and for routing the single bit to and from the P-registers of four neighboring processing elements 44 in the ARU 22 in "nearest neighbor" fashion. Flip flop 76 is in communication with the bidirectional data bus 52 through tri-state output gate 78 for transferring the content of flip flop 76 onto the bus, and through multiplexer 80 and logic gates 82 for transferring the logical state of the data bus to the flip flop. A select signal supplied by ACU 24 to one input 84 of gates 82 controls the output 85 of the gates to invert or directly pass the instantaneous logical state of the bidirectional data bus 52 to the multiplexer 80. The Q output of flip flop 76 is fed back to the input of multiplexer 80 through an AND gate 86, an exclusive OR gate 88 and an OR gate 90 to perform logical operations upon the input bit at line 85 under control of ACU 24 through multiplexer control lines 92. The result of the selected logical operation is the replacement of the original content of the P-register. The output Q of flip flop (P-register) 76 is supplied through output lines 98, to the P-registers of the four neighboring processing elements 44 in ARU 22 through a second multiplexer 94 in each element.

The second multiplexer 94 controlled by the ACU 24 through multiplexer control lines 97 selectively supplies an input from any of the four nearest neighbor processing elements 44 in array 22 to flip flop 76. The two control lines 97 enable a bit from one of the four input lines 98 to be passed through multiplexer 94 by digital encoding.

Thus, the logic circuitry associated with flip flop 76 enables transfer of bits from any of the four nearest neighbor processing elements to the P-register (flip flop 76) and enables any of several logical operations (gates 86, 88 and 90) to be selectively applied to the stored bit and the selected input signal on line 85 under control of the ACU 24. The logic circuitry also transfers the output of flip flop 76 to all four nearest neighbor processing elements through output line 98, selectively transfering the output to the P-register 76 in one of these processing elements.

Control signals supplied to input 102 of the flip flop 76 cause data from bus 52 to be stored in the flip flop from multiplexer 80 for processing. Also, control signals supplied from ACU 24 to control input 100 of tri-state output gate 78 cause processed data to be read out from flip flop 76 onto the bidirectional data bus 52. Thus, as discussed briefly above, whereas bits on data bus 52 are inputted and outputted with respect to the processing elements 44 only through the I/O unit 48, bits are also directly transferred among processing elements through sliding via data lines 98. Logical manipulation of bits in P-registers 76 are performed independently of the input/output mode.

Figure 6A:
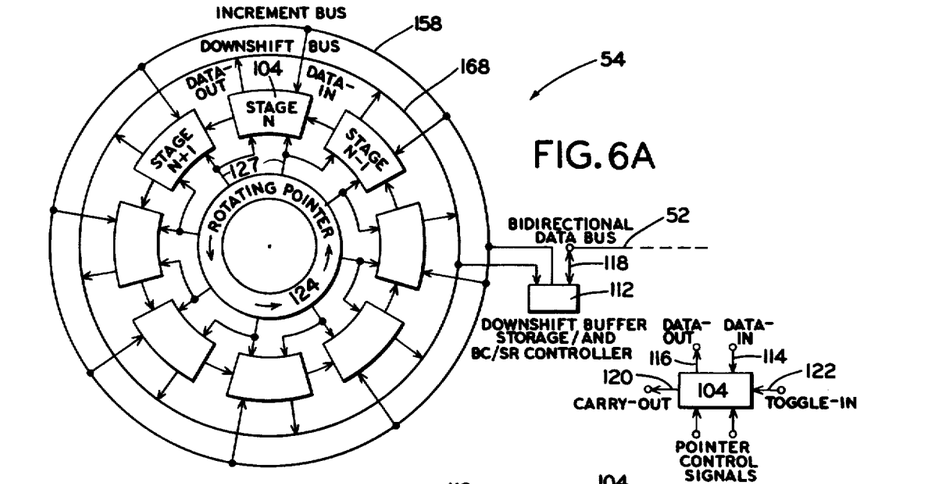
FIG. 6A is a block diagram showing a preferred embodiment of the binary counter/shift register (BC/SR) subunit shown in FIG. 2.

Referring to FIGS. 6A–6D, and initially to FIG. 6A, BC/SR subunit 54 is similar in function to a ripple counter with the additional capability of downshifting its stored contents. The BC/SR 54 comprises eight storage registers 104 arranged in the form of a ring, with each stage 104 being connected to a buffer storage and controller unit 112 (shown in detail in FIG. 6D) through input port 114 and output port 116. The selection of eight storage registers is arbitrary. The number selected in a given design depends on the required precision which, in turn, depends on the anticipated computations in a given application. Communication between the bidirectional data bus 52 and storage/controller 112 is through data port 118. Each stage 104 (shown in detail in FIG. 6B) of BC/SR 54 is adapted to send a carry signal to the next higher stage via a carry-out port 120 and is adapted to receive a carry signal from the next lower stage via toggle-in port 112.

The lowest stage of the BC/SR subunit 54 is defined by the position of a rotating pointer shown symbolically as counterclockwise arrows in the center region of subunit 54 in FIG. 6A. The rotating pointer 124, shown in detail in FIG. 6C, has a unique pointer output terminal 127 for each one of the BC/SR stages 104. The pointer 124 comprises eight, three-input AND gates 126 having inputs connected to a three-line data bus 130 upon which the output of a three-stage counter 128 is applied. Each of the gates 126 has a unique, internally wired logic to cause the outputs thereof to be successively high in response to counter 128, the output of one gate being high at any instant of time. Thus, with counter 128 up-counting in a free-running mode, a high output signal on the gate 126 output is continuously circulated to successively address the binary BC/SR stages 104. In this manner, the stage of the BC/SR 54 identified as "lowest" is continuously moved to successive stages on the ring. The lowest stage of BC/SR 54 is significant because communication between BC/SR 54 and data bus 52 is via the lowest stage. The BC/SR 54 design shown in FIGS. 6A–6D allows a BC/SR downshift operation almost immediately following a BC/SR increment operation because the downshift operation does not physically shift the BC/SR, whereas only the rotating pointer 124 changes the position of the lowest BC/SR stage, and so there is no need to wait for the propagation of ripple carry signals from stage 104 to higher stages arising from the preceding BC/SR increment operation.

Figures 6B, 6C:
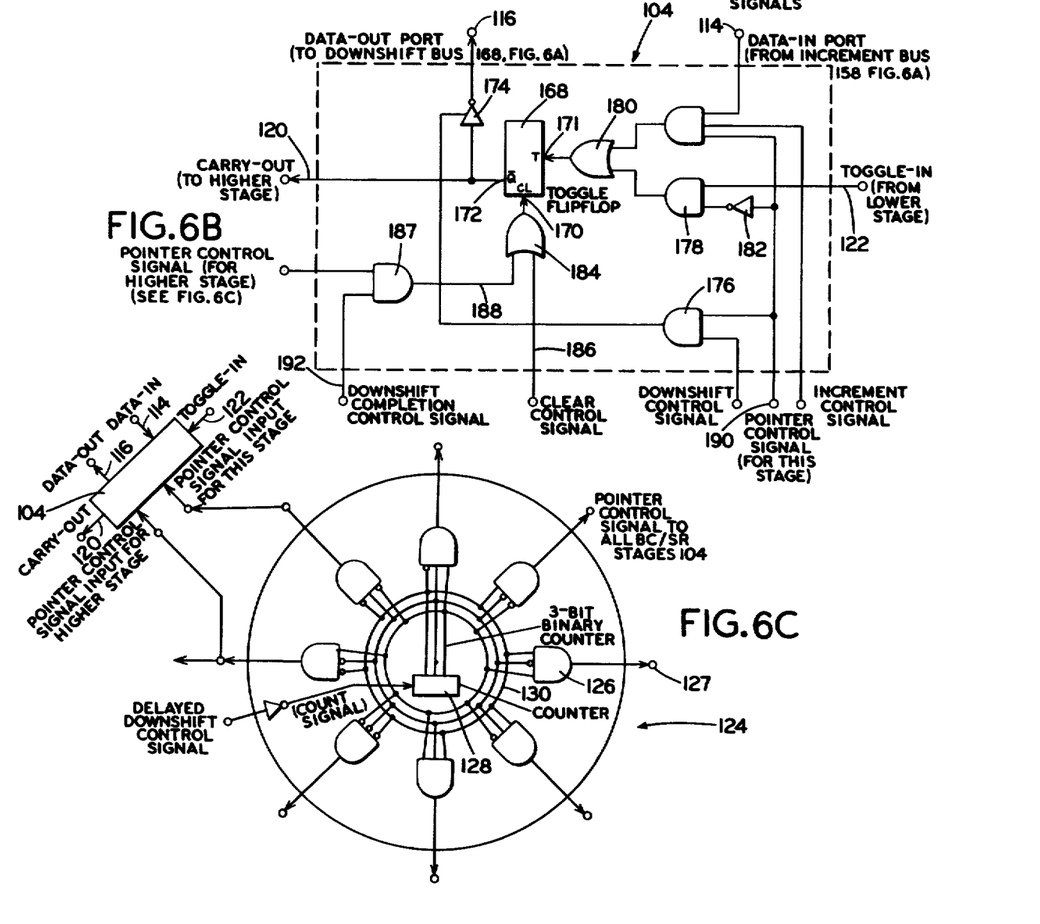
FIG. 6B is a circuit diagram showing a stage of the BC/SR shown in FIG. 6A.
FIG. 6C is a circuit diagram of a rotating pointer used in the BC/SR.
Figure 6D:
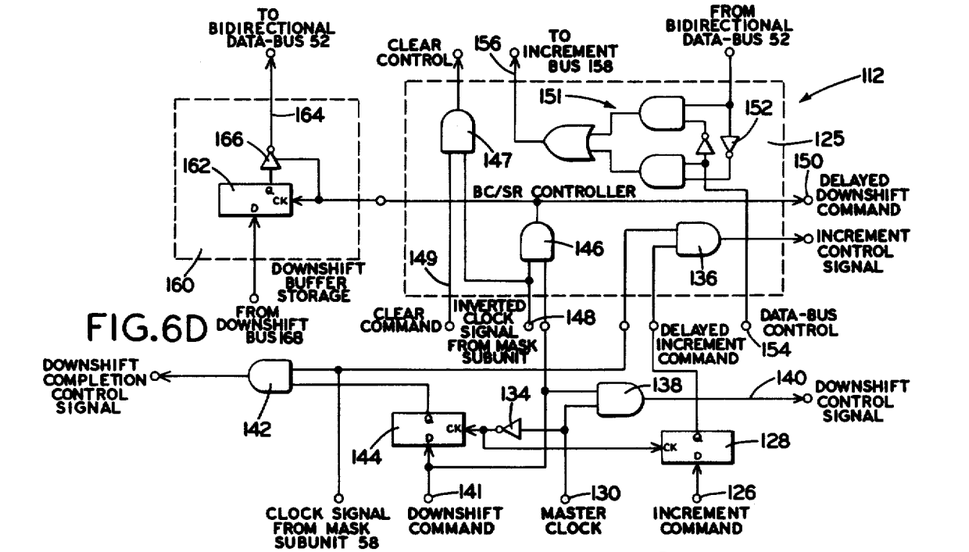
FIG. 6D is a circuit diagram of a downshift buffer storage and controller for the BC/SR.

Buffer storage/controller 112 in FIG. 6D stores the bit outshifted from the "lowest stage" of the BC/SR subunit 54 to be written into LMU 50 logically or arithmetically combined with the present stage of the corresponding P-register 76 or stored into other P-registers 76 along the data bus 52. Storage/controller 112 also generates the necessary control signals to all BC/SR stages 104 as well as to the rotating pointer 124.

Referring to FIG. 6D in more detail, the BC/SR controller portion 125 of storage/controller 112 comprises an array of gates that receive command signals from ACU 24 representing downshift, clear and increment, and generate corresponding control signals to components of the BC/SR subunit 54. The increment command at input port 126 is stored in a D flip flop 128. The clock signal from a master clock (not shown) at input port 130 strobes flip flop 128 following inversion in inverter 134 so that the increment command bit is stored in flip flop 128 at the trailing edge of the clock pulse. AND gate 136 outputs an increment control signal during the first portion of the next cycle period defined by the master clock.

Three control signals are generated by BC/SR controller 125 for downshift operation. The first signal (downshift control) is obtained from the output of AND gate 138 which transfers the downshift command applied to output port 140 in synchronism to the clock signal at clock input port 130. The second signal (downshift completion control) is obtained from the output of AND gate 142 responsive to a coincidence of a clock signal generated by mask subunit 58 (FIG. 2) and the downshift command signal applied at port 141 and transferred through flip flop 144 in synchronism with the master clock signal at port 130. The third control signal (delayed downshift control) is generated by AND gate 146 in response to the downshift command supplied by ACU 24 to port 141 and to an inverted clock signal from the mask subunit 58 applied to input port 148. The output of gate 146, identified by 150 is supplied to the counter 128 in FIG. 6C. A clear control signal generated by AND gate 147 is synchronized to a clear command supplied by ACU 24 at input 149 and the inverted clock signal at line 148.

Prior to transfer of data from bus 52 to the lowest stage of BC/SR 54 for in increment operation, the data passes through gates 151 as well as inverters 152. When a data bus control signal on input 154 is low, the output 156 of gates 151 increments BC/SR 54 via increment bus 158 if the instantaneous state of data bus 52 is high. If the data bus control signal is high, on the other hand, the complemented data bus state is applied to the increment bus on output 156 and increments the BC/SR 54 if the instantaneous state of data bus 52 is low. Thus the BC/SR 54 is incremented by either the true or complemented logical state of data bus 52 depending respectively on the low or high state of the data bus control signal applied at 154.

The downshift buffer storage portion 160 of buffer storage/controller 112 comprises a D-type flip flop 162 having an output 164 connected to bidirectional data bus 52 through a tri-state output gate 166. Information shifted out from the lowest stage of BC/SR subunit 54 is supplied to flip flop 162 along downshift bus 168 (FIG. 6A). The shifted out information is stored into flip flop 162 at the trailing edge of the master clock signal by being synchronized to the inverting clock signal from the mask subunit 58 through the gate 146.

Referring again to FIG. 6B, a single stage 104 of BC/SR 54 is shown in detail. The stage 104 comprises a toggle flip flop 168 having a clear input 170 and a toggle input 171. The output $\overline{Q}$ 172 of the flip flop 168 is supplied to the downshift bus 168 through a tri-state gate 174 that is controlled by an AND gate 176 responsive to the downshift control signal supplied by line 140 of controller 112 (FIG. 6D) and the pointer control signal generated by pointer 124 (FIG. 6C). Each of the stages 104 of BC/SR subunit 54 receives a toggle input from the next lower stage of 54 through AND gate 178 and OR gate 180. The lowest stage of subunit 54, which is the one receiving a high signal from pointer 124, receives a corresponding low signal through inverter 182. This effectively disconnects the lowest stage of the BC/SR subunit 54 from its neighboring lower stage in the ring structure shown in FIG. 6A. Toggle flip flop 168 is subsequently reset when the downshift completion control signal is high after the high pointer control signal has been transferred from the original lowest stage to the next higher stage. This is effected through OR gate 184 receiving the clear control signal on line 186 for clearing the entire BC/SR subunit 54, and the downshift completion control signal on line 188 at the end of a BC/SR 54 downshift operation.

The increment control signal generated by gate 136 in FIG. 6D is essentially a clock signal from the mask subunit 58 phase shifted by one full cycle period. Thus, the lowest stage of BC/SR subunit 54 (identified by a high signal at its pointer control input terminal 190, as shown in FIG. 6B) will be toggled if the selected toggle input is also high. This happens at the rising edge of the clock signal during the subsequent clock period.

During a downshift command, the tri-stage output gate 174 (FIG. 6B) of the lowest stage is closed, supplying the logical state of the stage onto the data bus 52. Then, the rising edge of the clock signal from AND gate 146 (FIG. 6D) of the BC/SR controller line at 150, that is, the delayed downshift control signal, which coincides with the trailing edge of the clock signal from the mask subunit 56, strobes the downshift bus 168 to transfer its instantaneous state into flip flop 162 in FIG. 6D. The falling edge of the delayed downshift control signal increments the counter 128 of the rotating point 124 (FIG. 6C) and thus moves the pointer location to the next higher stage. Furthermore, during the high period of the output of AND gate 146 (FIG. 6D), the tri-state output gate 166 of the downshift buffer storage 160 is closed so that the content of the lowest stage already stored in the downshift buffer storage can be read out and transferred to the data bus 52. During the high period of the downshift completion control signal at terminal 192 (FIG. 6B), because the original lowest stage has already become the new highest stage of the BC/SR subunit 54, this stage must be reset through AND gate 187 and OR gate 184.

Finally, it is to be noted that the clear control signal applied to line 186 of gate 184 in FIG. 6B resets all BC/SR stages 104. The clear operation can be performed either in a masked or unmasked mode.

Figure 7:
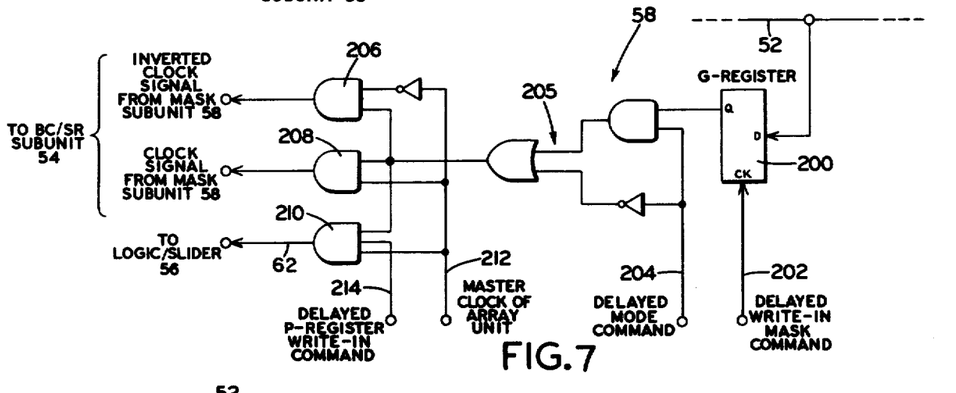
FIG. 7 is a schematic diagram of the mask subunit shown in FIG. 2.

Referring to FIG. 7, mask subunit 58 which controls the operation of BC/SR subunit 54 as well as the logic-slider subunit 56 in response to a mode control signal, is shown in detail. The mask subunit 58 comprises a register (G-register) 200 that stores a mask bit which selectively inhibits or activates logic-slider subunit 56 and BC/SR subunit 54 if the ACU 24 calls for a masked mode of operation that is communicated to the mask subunit 58 over the bidirectional data bus 52. The high or low signal indicating whether or not a masked mode is called for is clocked into G-register 200 by a delayed write in mask command generated by ACU 24 onto flip flop clock line 202. The bit stored in G-register 200 is thereafter transferred, through logic circuit 205, to gates 206 and 208 to be transferred in the inverted and noninverted forms, respectively, to the BC/SR subunit 54 and through gate 210 to the logic-slider subunit 56 in response to the master clock signal supplied to line 212 and the delayed P-register write in command applied to line 214. The logic circuit 205 synchronizes enablement of the gates 206, 208 and 210 with respect to generation of the mode command on line 204. The command inputs shown in FIG. 7 are generated by control signal distributor 250 illustrated in FIG. 11.

Figure 8:
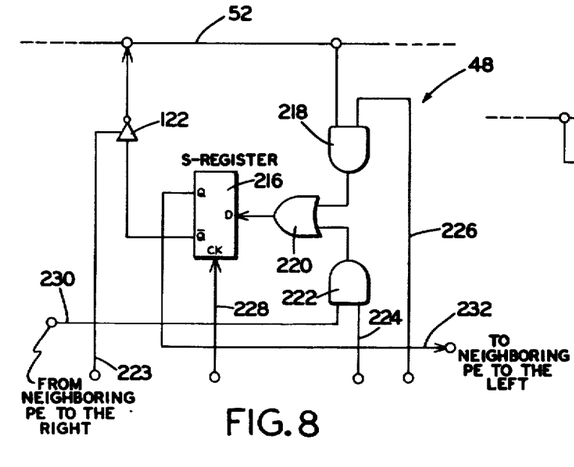
FIG. 8 is a schematic diagram of an I/O unit shown in FIG. 2.

Referring to FIG. 8, I/O unit 48 comprises a single bit register 216 (S-register) that receives data from bidirectional data bus 52 through gate 218 and gate 220. The bit stored in register 216 is read out onto the data bus 52 through tri-state output gate 122 under control of line 223. Control signals applied to lines 224 and 226 to the input of gates 222 and 218, respectively, determine whether the subunit 48 is executing a slide operation or simply storing information directly from data bus 52. Storage of data into S-register 216 is synchronized to the master clock on line 228. Input 230 to gate 222 is supplied from the neighboring processing element to the right, whereas the output 232 of register 216 is supplied to the neighboring processing element to the left. The input control signals applied to lines 223, 224, 226 and 228 are all generated by control signal distributor 250 (FIG. 11), described below.

Figure 9:
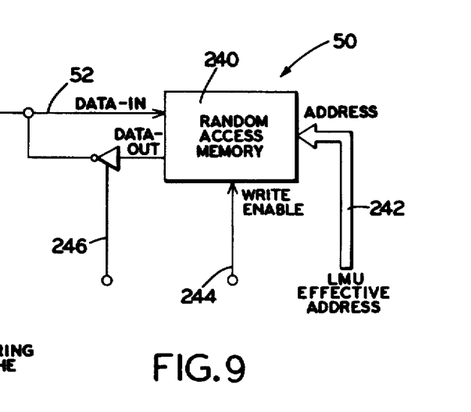
FIG. 9 is a diagram showing flow of data and control signals with respect to the local memory unit of FIG. 2.

Referring to FIG. 9, LMU 50 comprises a random access memory (RAM) 240 that is addressed by ACU 24 on address line 242. The memory 240 is in a write mode when a high write enable signal is applied to line 244. If this signal is low, LMU 50 is in the read mode and the contents of the RAM at an address location are transferred from the memory to the bidirectional bus 52 by a control signal applied to line 246. The signals applied to lines 244 and 246 of the LMU 50 are generated by distributor 250 shown in FIG. 11. It is noted that the RAM 240 of LMU 50 as well as the I/O unit 48 described in FIG. 8 are not controlled by the mask subunit 58 shown in FIG. 7.

Figure 10:
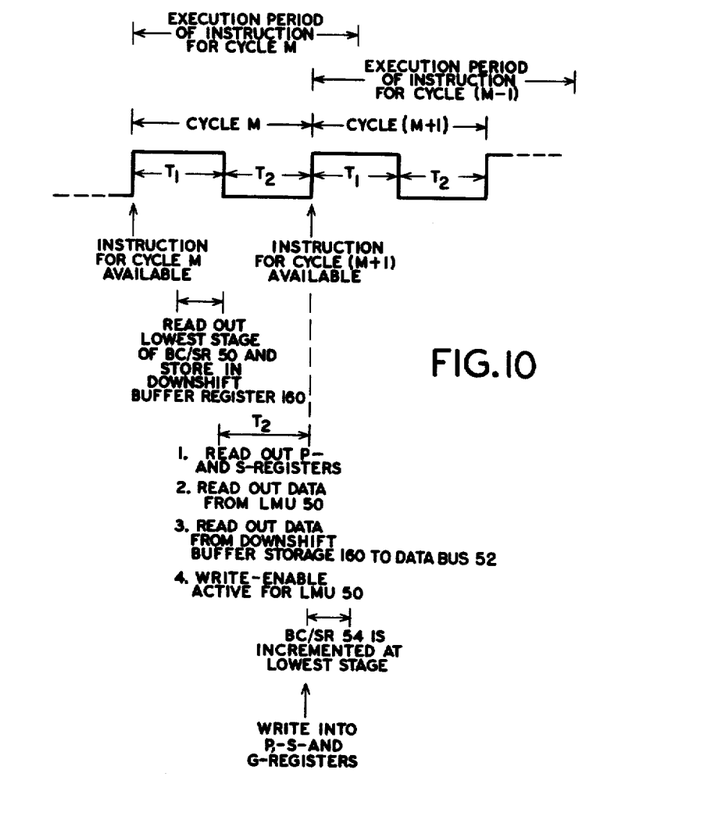
FIG. 10 is a signal timing diagram for operating the processing elements.

Referring to FIG. 10, timing and sequencing of the basic operations of the processing elements 44 are shown. Two successive cycles in the master clock signal having a cycle period M are illustrated. Each cycle has a high level that extends for a duration of $T_1$, and a low level that extends for a duration of $T_2$. The repetition rate of the clock signal is determined by the minimum access time and maximum clock rate of the RAM used in LMU 50, and in practice, is ten megahertz.

An instruction to be executed during each clock period stored in an array instruction register (not shown) within ACU 24 becomes available to the processing elements 44 at the rising edge of the clock cycle, as shown. During the high level period $T_1$, the lowest stage of BC/SR subunit 54 is read out and stored into downshift buffer storage 160 (FIG. 6D) at the trailing edge of the high level period $T_1$ (assuming that the instruction calls for a downshift operation). During the low level period $T_2$, data stored in the P- and S-registers, 76 (FIG. 5) and 216 (FIG. 8), respectively, are read out if a logic or arithmetic operation or a data routing (sliding) operation is called for. If data must be read from LMU 50, the RAM in the LMU 50 is accessed during the $T_2$ period. If a BC/SR downshift operation is called for, the data already sorted in the buffer storage 160 (FIG. 6D) during period $T_1$ will now be read out into the bidirectional data bus 52.

During the rising edge of a subsequent clock cycle (M+1), any writing of data into the P, S or G-registers called for by instruction M will be executed. If the present array instruction M calls for incrementing the BC/SR subunit 54, the subunit is incremented at the lowest stage of the subunit by the instantaneous state of the data bus or by the logical complement of the state of the data bus as discussed above in connection with FIG. 6A.

Thus, as illustrated in FIG. 10, the execution period of an array instruction is slightly longer than one cycle $(T_1+T_2)$. In fact, the last portion of the execution period of instruction M overlaps with the beginning portion of the execution period of instruction M+1. The actual execution rate of the computer, however, is measured by the cycle rate rather than the execution period. The above overlap is intentionally built into the design in order to achieve the highest throughput.

Figure 11:
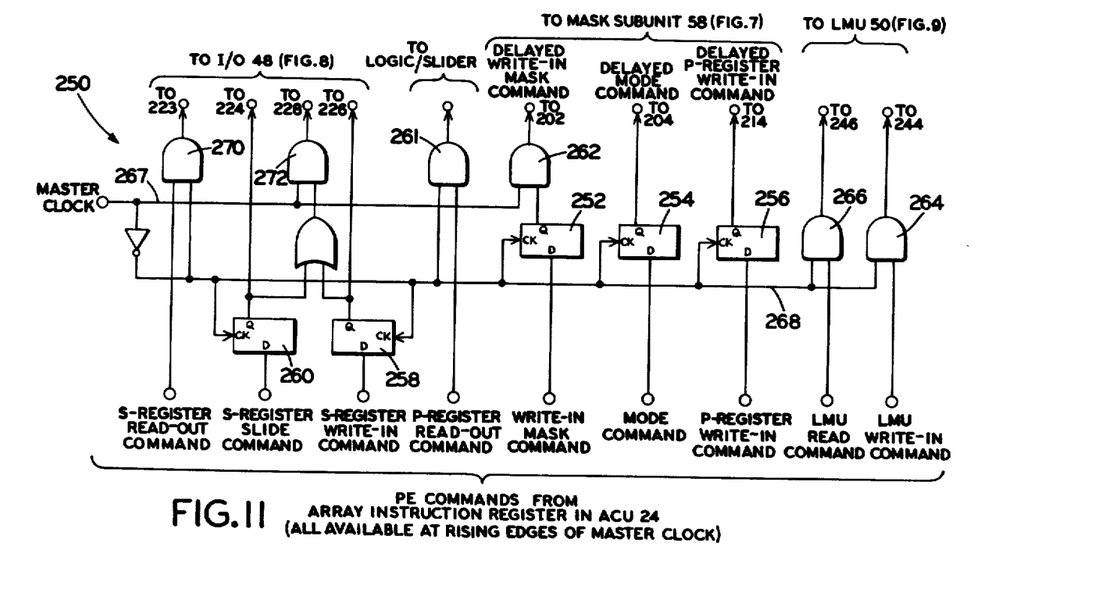
FIG. 11 is a circuit diagram of a processing element command and control signal distributor.

The generation of control signals for operating the I/O unit 48, the logic-slider subunit 56, the mask subunit 58 and the LMU 50 are generated by a processing element command and control signals distributor 250, shown in FIG. 11.

Figure 12:
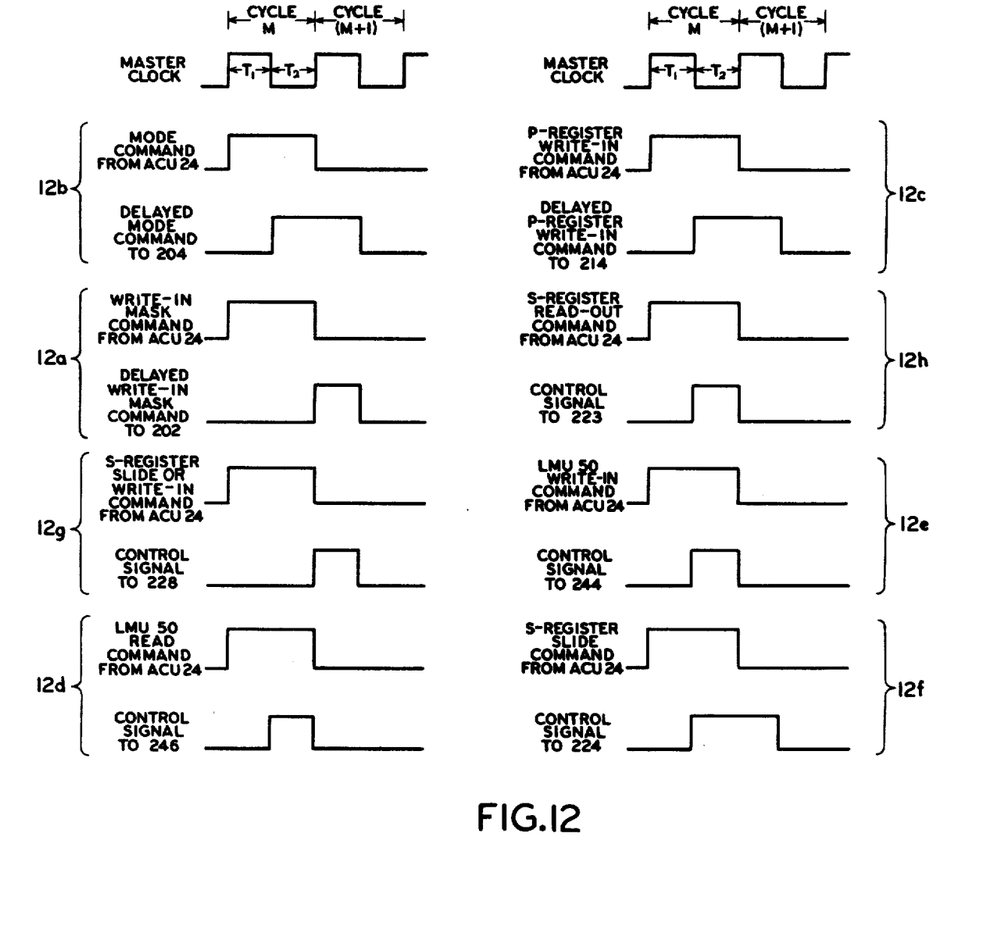
FIG. 12 is a signal timing diagram for operating the distributor shown in FIG. 11.

The timing relationships among the various input and output signals in the distributor 250 are illustrated in FIG. 12. The distributor 250 comprises five D-type flip flops 252, 254, 256, 258 and 260 for delaying by a period $T_1$ the incoming command signals generated by the instruction register of ACU 24. These flip flops are strobed by the inverted master clock signal on line 268 so that data are stored into said flip flops at the trailing edges of the clock pulses (the leading and trailing edges of the clock pulses are separated by the time duration $T_1$).

AND gate 262 combines the output of flip flop 252 and the master clock signal on line 267 to form a pulse of duration $T_1$ starting at the rising edge of the subsequent cycle, as shown in FIG. 12a. The output of gate 262 is supplied to the mask subunit 58 at line 202 shown also in FIG. 7. The delayed outputs of flip flops 254 and 256 are supplied, respectively, to lines 204 and 214 of the mask subunit 58. Timing of the signals generated by registers 254 and 256 is shown, respectively, in FIGS. 12b and 12c.

The signals to lines 244 and 246 of LMU 50 (FIG. 9) are supplied, respectively, by gates 264 and 266 in FIG. 11. The outputs of gates 264 and 266 are responsive, respectively, to write and read commands generated by the array instruction register within ACU 24 synchronized to the master clock inverted line 268. The timing of the write and read signals is shown in FIG. 12d and 12e, respectively.

The control signals supplied to lines 223, 224, 226 and 228 of I/O unit 48 (FIG. 8) are generated, respectively, by gate 270, flip flop 260, gate 272 and flip flop 258. The outputs of gates 270 and 272 are synchronized to clock line 267, whereas the outputs of flip flops 258 and 260 are delayed by the period $T_1$. Timing of the signals generated by the flip flop 260 and gate 270 is shown, respectively, in FIGS. 12f and 12h. Timing of signals generated by the flip flop 258 or 260 and by gate 272 is shown in FIG. 12g.

The gating signal supplied to line 100 of logic-slider 56 (FIG. 5) is generated by gate 261 synchronized to inverted clock line 268 as shown in FIG. 11.

Thus, each processing unit 44 under the control of a common set of instructions stored in ACU 24 can be programmed to provide any predetermined logical or arithmetic manipulation on a bit stored in each processing element 44 in ARU 22. In general, every stored bit in the ARU 22 is operated on identically, however, certain predetermined processing elements may be inhibited by its mask subunit 58, if so desired, by programming the system in mask mode.

Because each processing element 44 contains all of the logical and arithmetical components necessary to perform a wide variation of data manipulations, the system 20 is highly versatile, and can be adapted to perform complex algorithmic operations, such as cross correlation for image identification, image rotation, classification, distortion correction and other forms of image analysis.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An apparatus for processing multidimensional, digital serial-by-bit data characterized by an ordered array of parallel data streams, comprising an ordered array of interconnected parallel processing elements corresponding to all or part of the data streams, and a control unit connected to said processing elements for causing said processing elements to process the data streams in response to a single set of instructions, each of said processing elements comprising a subunit A including means for arithmetic, shifting and memory operations, a subunit B including means for storing data, performing logical operations and sliding the stored data to a similar subunit in a neighboring processing element, a subunit C including means for storing, inputting and outputting data, a subunit D including additional memory means, and a bidirectional bus, all of said subunits being connected to said bidirectional bus for providing communication between said subunits.

2. The apparatus of claim 1, wherein subunit A includes a counter/shift register.

3. The apparatus of claim 2, wherein said counter/shift register includes means for storing bits, means responsive to a first command signal from said control unit for shifting said stored bits, and means responsive to a second command signal from said control unit for digitally adding said stored bits to an incoming bit.

4. The apparatus of claim 2, wherein said counter/shift register comprises a plurality of registers arranged in a closed ring configuration, pointer means for supplying a pointer signal to said register ring for defining the lowest register in said ring, and counter means for successively indexing said pointer means, the lowest register, defined by said pointer means, outputting its content to said common bus.

5. The apparatus of claim 1, wherein subunit D includes a random access memory.

6. The apparatus of claim 1, wherein each of said processing elements further includes a subunit E including means for selectively inhibiting the operability of subunits A and B, said subunit E also being connected to said bus.

7. An apparatus for processing multidimensional, digital serial-by-bit data in the form of an N×M array of parallel data streams, comprising a first N×M array of subunits A each including means for arithmetic, shifting and memory operations, a corresponding, second N×M array of subunits B including means for storing data, performing logical operations and sliding stored data to similar subunits in said array, a corresponding, third N×M array of subunits C including means for storing, inputting and outputting data, and a corresponding, fourth N×M array of bidirectional buses, said arrays being interconnected in an ordered fashion, means for transferring data among said subunits and said arrays including said bidirectional buses, and a control unit connected to said arrays for controlling processing of all of said data streams in said first, second and third arrays in accordance with a single set of instructions.

8. An apparatus for processing multidimensional, digital serial-by-bit data in the form of an N×M array of parallel data streams, comprising an N×M array of interconnected parallel processing elements corresponding in position, respectively, to the parallel data streams, and a control unit connected to said processing elements responsive to a single set of instructions for causing said array of processing elements to perform identical and simultaneous operations on single bit slices of the parallel data streams, each of said processing elements comprising a subunit A including means for arithmetic, shifting and memory operations, a single bit subunit B for storing a bit and including means for performing logical and sliding operations, a subunit D having additional memory means, and a bidirectional bus, each of said subunits being connected to said bidirectional bus for providing communication between said subunits.

9. The apparatus of claim 8, wherein the memory of subunit D provides for random access.

10. The apparatus of claim 8, wherein said control unit provides means for sliding the data content of a subunit B to another subunit B of a neighboring processing element.

11. The apparatus of claim 8, wherein each processing element further includes a subunit E for inhibiting the operations of said subunits A and B in response to a mask mode command generated by said control unit.

12. The apparatus of claim 8, wherein said subunit A includes a counter/shift-register including means for storing bits, means responsive to a first command signal from a control unit for shifting said stored bits, and means responsive to a second command signal from said control unit for digitally adding said stored bits to an incoming bit.

13. The apparatus of claim 8, wherein said counter/shift-register comprises a plurality of registers arranged in a closed ring configuration, pointer means for supplying a pointer signal to said register ring for defining the lowest register in said ring, and counter means for successively indexing said pointer means, the lowest register, defined by said pointer means, outputting its content to said bidirectional bus.

14. An apparatus for processing multidimensional, digital serial-by-bit data characterized by an ordered array of parallel data streams, comprising an ordered array of interconnected parallel processing elements corresponding to all, or part, of the data streams and a control unit connected to said processing elements for causing said processing elements to process the data streams in response to a single set of instructions, each of said processing elements, in turn, comprising a subunit including a binary counter/shift register, a subunit including logic for sliding data to one of a plurality of adjacent processing elements, a masking subunit for optionally inhibiting a given processing element from responding to a signal from said control unit, a subunit including storage and means for inputting or outputting data from a given processing element, a subunit including additional memory over that provided by the subunit including the binary counter shift register, and a bidirectional bus, all of said subunits being directly connected to said directional bus, said interconnection allowing for communication between said subunits.

* * * * *